July 21, 1931.  C. G. SMITH  1,815,121
GAS PUMP
Original Filed Sept. 22, 1924   3 Sheets-Sheet 1

Inventor:
Charles G. Smith,
by Roberts, Roberts & Cushman,
Attys.

July 21, 1931.  C. G. SMITH  1,815,121
GAS PUMP
Original Filed Sept. 22, 1924   3 Sheets-Sheet 3
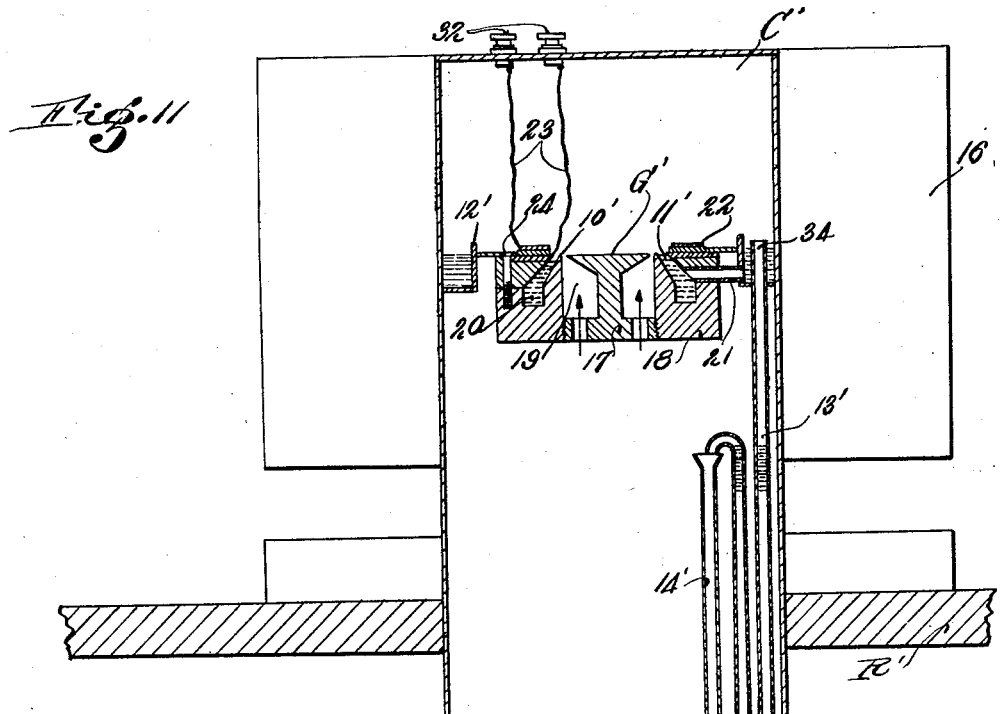
Fig. 11
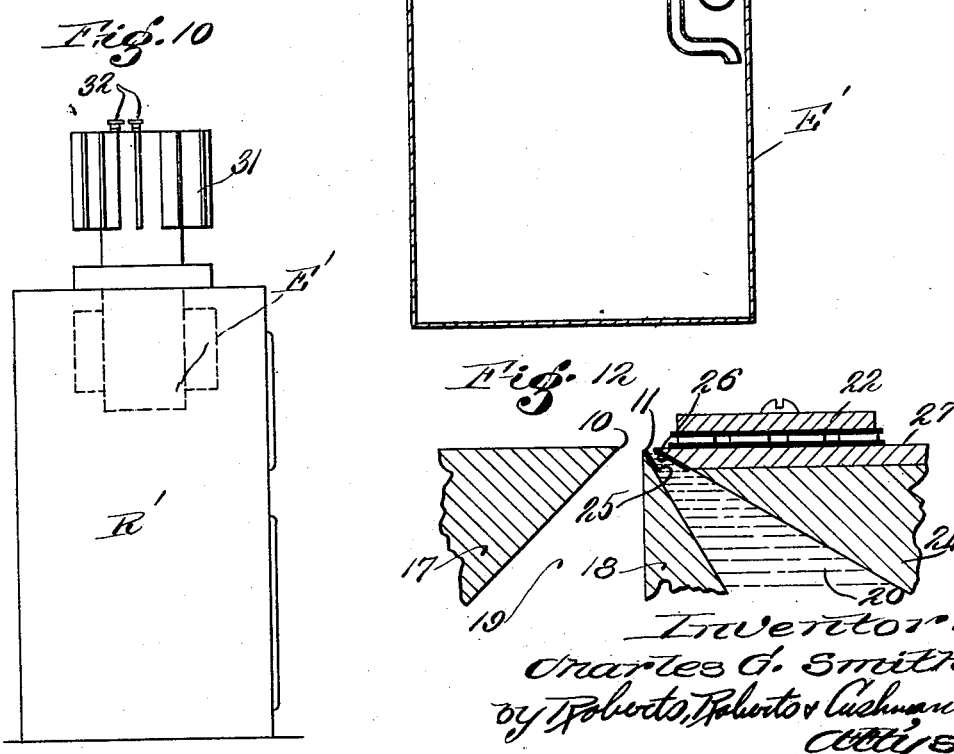
Fig. 10
Fig. 12
Inventor:
Charles G. Smith,
by Roberts, Roberts & Cushman
Attys.

Patented July 21, 1931

1,815,121

UNITED STATES PATENT OFFICE

CHARLES G. SMITH, OF MEDFORD, MASSACHUSETTS, ASSIGNOR, BY MESNE ASSIGNMENTS, TO CAMBRIDGE LABORATORIES, INC., OF CAMBRIDGE, MASSACHUSETTS, A CORPORATION OF MASSACHUSETTS

GAS PUMP

Application filed September 22, 1924, Serial No. 739,007. Renewed January 6, 1931.

This invention relates to the flow of a gaseous fluid by the molecular movement of heated molecules. The present invention utilizes a molecular movement in which the directional effect of the propellant molecules persists longer than that of the molecules of the gaseous fluid to be propelled. Thus the propellant molecules, which are initially directed in the general direction of desired flow, may collide with more gaseous molecules before losing their directional effect than in the case of molecules having less persistence in a general direction. This persistence of directional effect may be attained by imparting greater momentum to the propellant molecules, either by giving the molecules greater initial velocity or by using molecules having greater mass or both. For example when using water vapor as the refrigerant and using heated mercury molecules as the propellant, the mercury molecules are relatively heavy and by virtue of their heated condition have high velocity, thereby having greater momentum and greater persistence of direction or mean directional effect.

In one aspect the present invention involves the circulation of a gaseous fluid through a restricted opening by producing in the region of the opening a molecular movement of a vapor supplied independently of the fluid, the molecular movement being directed predominantly away from the opening and the mean effective path of the vapor molecules being so correlated with the width of the opening that the molecular movement is effective substantially throughout the width of the opening to impel the gaseous fluid through the opening. The vapor is preferably superheated so that the collisions of said molecules with the molecules of the fluid impart more energy to the latter, thereby producing a more rapid flow. To make said molecular movement effective throughout the width of the opening, thereby to counteract back pressure, the vapor molecules should have a mean effective path (that is average travel in a general direction notwithstanding one or more collisions with gaseous molecules) of the order of the width of the opening. By using a vapor whose molecules have a relatively long mean effective path, such as mercury, the opening may be made correspondingly wide. The propelling vapor may be supplied to the region of the opening in vapor form or it may be generated in said region. When the vapor is supplied as such it is preferably fed through a slit in close juxtaposition to the slit through which the gaseous fluid is drawn.

For the purpose of illustrating the genus of the invention typical concrete embodiments are shown in the accompanying drawings in which:—

Fig. 2 is an enlarged central vertical section of the upper portion of Fig. 1, the vanes for the evaporating chamber being omitted;

Fig. 4 is an enlarged detail of the grid of Figs. 1 to 3;

Figs. 5 and 6 are modified grids applicable to the embodiment shown in Figs. 1 to 4;

Fig. 11 is an enlarged central vertical section of the upper part of Fig. 10, the vanes for the evaporating chamber being omitted; and Fig. 12 is an enlarged detail of the grid of Figs. 10 and 11.

In these drawings, which are largely diagrammatic and which omit obvious details of construction, R represents a refrigerator the interior of which is to be cooled.

The particular embodiment of the invention shown in Figs. 1 to 4 comprises an evaporating chamber E provided with radial conducting vanes 1 (Fig. 1) and located inside the refrigerator, a condenser C located outside the refrigerator and having inner and outer walls providing a space therebetween for cooling water which is circulated through pipes 2 and 3, grid G for drawing the refrigerant evaporated in chamber E into the condenser by the molecular movement of the propellant, a boiler B for evaporating the propellant, an insulated vapor duct 4 leading from the boiler to grid G, and a duct 4' for returning the propellant to the boiler in liquid form.

Figure 1:
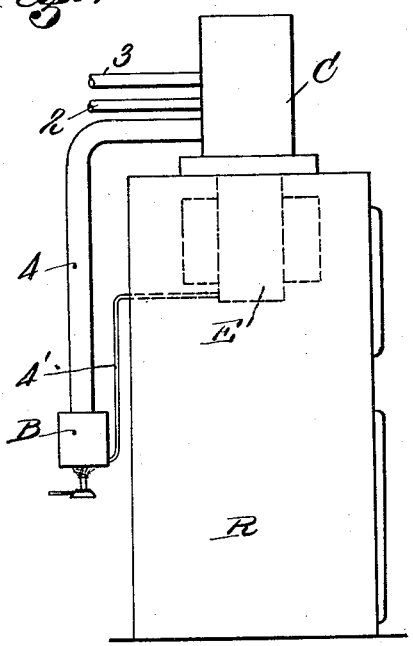
Fig. 1 is a side view of one embodiment applied to a refrigerator.
Figure 7:
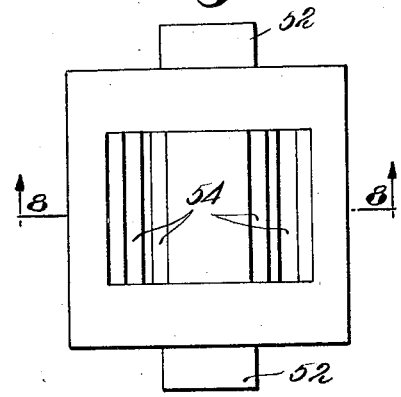
Fig. 7 is a plan view of a modified grid.
Figure 8:
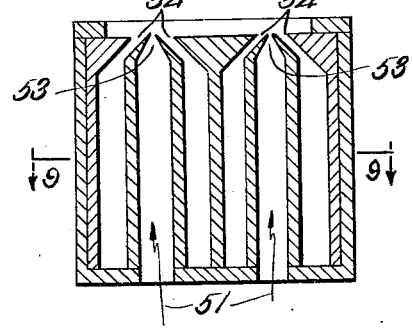
Fig. 8 is a section on the line 8—8 of Fig. 7.
Figure 3:
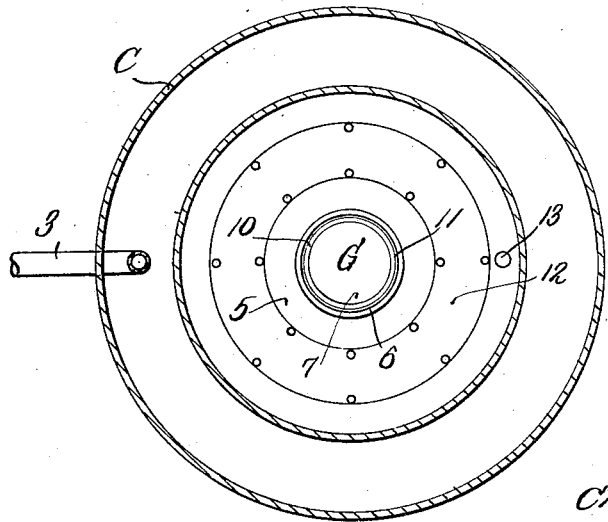
Fig. 3 is a section on line 3—3 of Fig. 2.
Figure 9:
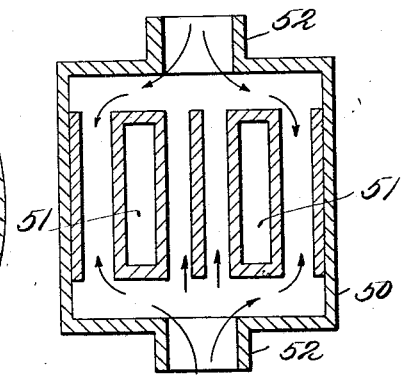
Fig. 9 is a section on the line 9—9 of Fig. 8.

The particular form of grid shown in Figs. 2, 3 and 4 comprises three annular members 5, 6 and 7 threaded together and provided with recesses which when the members are assembled afford passageways 8 and 9 for the refrigerant and propellant respectively. At the upper ends these passageways terminate in annular openings 10 and 11 which are separated only by a thin edge and whose widths have the unique relationships to the mean effective path of the vapor molecules above referred to. For example when using water as the refrigerant and mercury as the propellant, with pressures of 4 mm., 27 mm., and 6 to 10 cm. in the evaporator, condenser and boiler respectively, the openings 10 and 11 may be approximately four-thousandths and one-thousandth inch wide respectively.

A partition 12 separates the evaporating chamber E from the cooling chamber and the outer portion of this partition is depressed to form a channel in which the condensed liquid collects. A pipe 13 containing a trap 14 serves to convey the condensed liquid to the chamber E. The pipe 13 is preferably small, having for example an internal diameter of the order of one-sixteenth inch.

The operation of the system shown in Figs. 1 to 4 is as follows. The liquid refrigerant in the bottom of chamber E is evaporated by the heat absorbed from the interior of the refrigerator and the vapor is drawn through the opening 10 by the molecular action of the propellant supplied to the adjacent opening 11. The refrigerant and propellant vapors mix as they emerge from their respective openings and both are condensed in the condenser. The condensed refrigerant and propellant feed by gravity through pipe 13 and trap 14 into the evaporating chamber. By using a propellant (e. g. mercury) which is heavier than the refrigerant (e. g. water) and immiscible therewith, the propellant is caused to settle to the bottom of the evaporating chamber, whence it returns to the boiler through pipe 4'. The pressures employed in the evaporator and condenser are preferably such that the propellant stands at a level somewhat below the bottom of the evaporator so that only refrigerant collects in the bottom of the evaporator; and owing to the boiler pressure the propellant stands at a higher level in pipe 4' than in the boiler. The propellant is continuously evaporated in the boiler and supplied through pipe 4 to the opening 11. Thus the refrigerant circulates around the closed circuit comprising evaporator E, passage 8, opening 10, condenser C, pipe 13, and trap 14, the refrigerant passing through the opening 10 in vapor form; and the propellant circulates around the circuit comprising boiler B, pipe 4, opening 11, condenser C, pipe 13, trap 14, evaporator E, and pipe 4'.

By virtue of the small dimensions of the openings 10 and 11 and their close juxtaposition, the molecular movement of the propellant molecules is effective throughout substantially the entire width of the refrigerant opening. Since the dimensions of the openings are determined by the flight of the molecules leaving the opening 11 it is desirable to use a propellant whose molecules have a long mean free path. Mercury is particularly suitable since its molecules not only have a relatively long mean free path but they also are heavy and therefore may impact several times with lighter molecules such as water molecules without being greatly deflected or retarded. Thus when using a propellant such as mercury with a refrigerant such as water the opening 10 may be several times wider than the mean free path of the propellant molecules.

While the propellant vapor issuing from opening 11 may exert some aspirating effect upon the refrigerant the rate of flow of the propellant vapor is preferably so low that this effect is secondary to the effect of the molecular movement of the molecules of the refrigerant as the refrigerant emerges from the opening 11.

The grid construction may of course vary widely from the particular form illustrated in Figs. 2 to 4. For example as illustrated in Figs. 5 to 9 the grid openings may be straight instead of annular; a propellant opening may be provided on each side of each refrigerant opening; and the obliquity of the propellant openings relative to the refrigerant openings may be varied to suit various conditions of use. In Figs. 5 and 6, the refrigerant opening 30 is bounded by propellant openings 31 which have different degrees of obliquity relative to the central opening. The grid shown in Figs. 7, 8 and 9 comprises a box 50 having bottom openings 51 for admission of refrigerant and end openings for admission of propellant. Partitions inside the box keep the two vapors separate until they issue from the refrigerant openings 53 and propellant openings 54, respectively, these openings being straight instead of circular.

Figure 10:
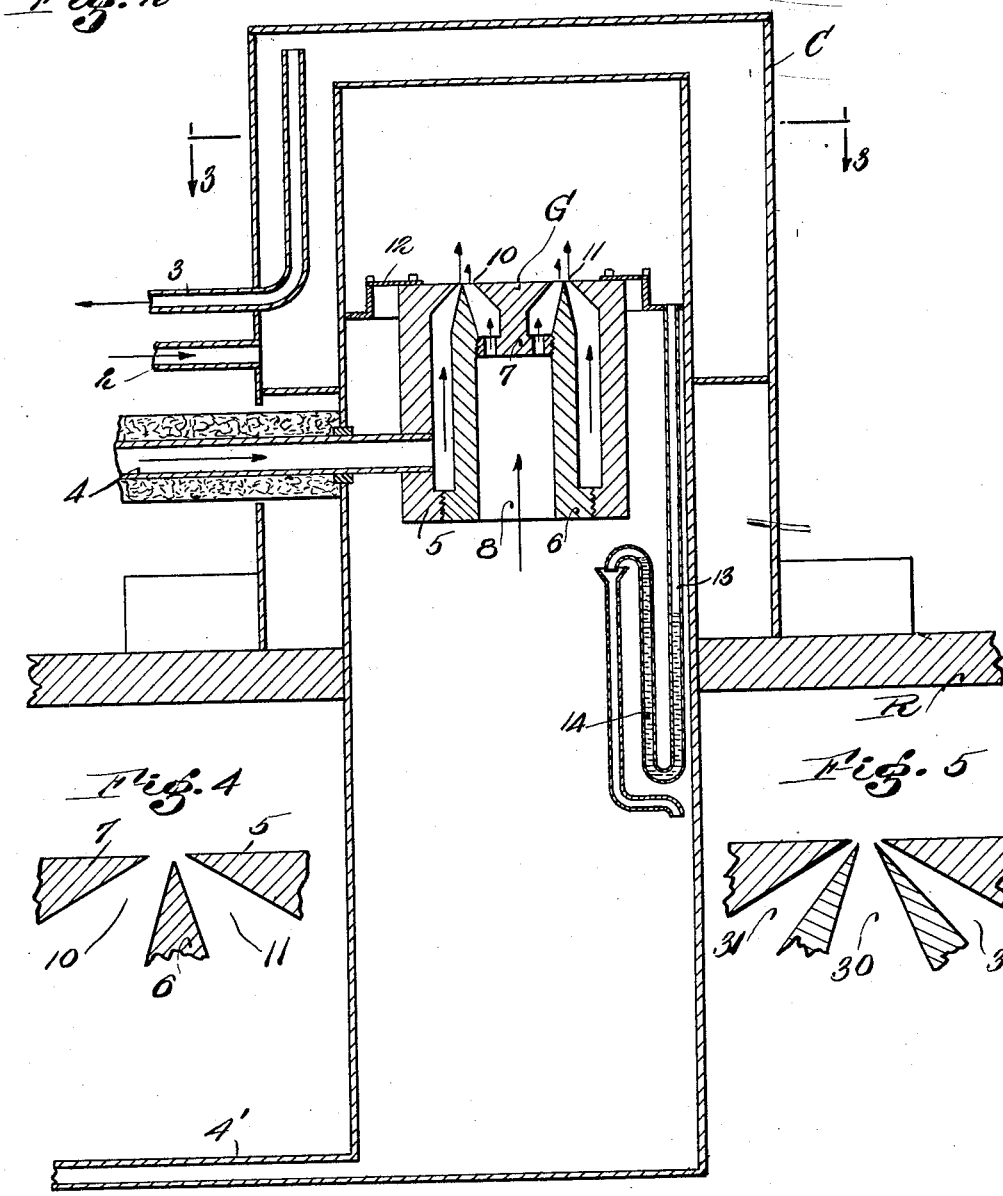
Fig. 10 is a side view of another embodiment.

The embodiment of the invention illustrated in Figs. 10, 11 and 12 is also shown as applied to a refrigerator R' and also comprises an evaporator E' having vanes 1'; a condenser C', a grid G' having refrigerant and propellant openings 10', and 11'; a partition 12' and a return pipe 13' and trap 14'. However, the condenser is cooled by air vanes 16 instead of a water jacket and the grid 6' is constructed differently.

The grid is formed of two annular members 17 and 18 threaded together and shaped to provide a passageway 19 therebetween. The member 18 has an annular recess 20 in its upper side terminating in the restricted opening 11' and communicating through duct 21 with the trough in partition 12'. This recess is filled with mercury or other propellant which stands at approximately the same level in the trough in partition 12'. The pipe 13' projects slightly above the level of the propellant so that only refrigerant flows therethrough to the evaporator. An annular electric heating grid, supplied with current through leads 23, is mounted on top of the grid adjacent opening 11' to vaporize the propellant at the opening, thereby to produce the aforesaid molecular activity which draws the refrigerant vapor through opening 10' in a manner similar to that above described in connection with the first embodiment.

In order to localize the vaporization of the propellant substantially at the opening 11' a ring 24 of soap-stone or other insulation is preferably provided between the heating element and the body of propellant in the recess 20. The surface 25 (Fig. 12) adjacent the opening 11' is preferably composed of a material which is wet by the propellant so that the propellant will creep up to the extreme edge of the opening. If the member 18 be formed of copper and the propellant consists of mercury the surface 25 may be formed by first plating with platinum, then coating with sodium amalgam, and finally removing the sodium by immersion in water, whereby the surface may be wet with the mercury. The surface 26 opposite surface 25 is preferably formed of a material which is not wet by mercury; for example, if plate 27 be formed of copper, surface 26 may comprise nickel plating. With this arrangement the mercury level is better maintained uniformly close to the opening 10'.

In operation the surface of the propellant in opening 11' is maintained substantially at the boiling point to produce rapid vaporization adjacent the opening 10' while the body of the liquid in recess 20 is preferably maintained slightly below the boiling point (by insulation 24) to avoid agitation. The molecular movement of the propellant molecules away from the liquid surface in opening 11' produces a flow of refrigerant through opening 10' as above described. Both propellant and refrigerant are condensed in C', the heavier propellant settling to the bottom of trough 12' and the refrigerant overflowing through pipe 13' into the evaporator.

In its operation this refrigerator differs from a device in which a swiftly moving jet is used in the following particulars. In the latter by having the jet of propellant vapor travel swiftly, the relative motion between propellant molecules is substantially reduced. Thus the tendency for the jet to flare is reduced in a great degree. This swift motion is relied upon to get the exhausted vapor or gas past the junction of the propellant and other vapor and thus prevent the return of the exhausted vapor or gas and also to prevent the propellant vapor from going counter to the exhausted stream of gas. In this device, however, there is an annular stream of propellant vapor the width of which at issuance is comparable to the mean free path of the vapor. The body of the gas as a whole moves so very slowly that the relative motion between the propellant particles is substantially the same as if the body of the gas were in a state of rest. The propellant vapor as a whole is just given sufficient motion so that it has a general draft away from orifice 10, that is, from the refrigerant vapor orifice. By moving the propellant vapor so slowly, the molecules mix with the refrigerant molecules very thoroughly and give the latter a predominant drift away from the refrigerant orifice. By making the refrigerant orifice of the order of the mean free path of the propellant vapor, the tendency for any propellant vapor to enter the refrigerant orifice is substantially eliminated. Hence, there is no necessity for preventing the propellant jet from flaring out as in Langmuir's pump, since the size of the refrigerant orifice is such that the propellant vapor can not get into it. The propellant vapor, therefore, does not have to travel so fast that it gets far beyond the refrigerant orifice before it loses any of its original velocity.

It is obvious that mercury and water are not necessarily the only two substances that may be used. In general the liquids should be immiscible, have as great a difference in weight as possible and have no tendency to react toward each other at high temperatures. Thus it is evident that water could be used as a propellant and a very much lighter substance such as a very light oil or ether as the refrigerant.

While the present invention is herein illustrated as applied to a refrigerating system, it is to be understood that it is capable of general application for the circulation of a gaseous fluid.

I claim:

1. A gas pump comprising a gaseous fluid duct having therein a restricted opening through which the fluid passes in gaseous form, means for producing throughout a narrow width at the side of said opening and predominantly toward the outlet end thereof, a molecular movement of vapor molecules, and means for supplying said vapor molecules to the side of said opening independent of said gaseous fluid, the width of said opening being of the order of the mean free path of the gas particles issuing therefrom.

2. A gas pump comprising a gaseous fluid duct including a restricted opening through which the fluid passes in gaseous form, means for producing through a narrow slit adjacent said opening and predominantly toward the outlet end thereof a molecular movement of vapor molecules having a mean effective path greater than the of the fluid molecules, the width of said opening being of the order of the mean free path of the issuing gas.

3. A gas pump comprising a gaseous fluid duct having therein a wall provided with an opening through which the fluid passes in gaseous form, said wall having a juxtaposed opening separated from said first opening by a sharp edge, and means for supplying heated gas to said second opening, the two openings being of the order of the mean free path of the issuing gases.

4. A gas pump comprising a container from which gas is to be pumped, a conduit leading from said container, said conduit ending in an orifice whose width is of the order of the mean free path of the gas molecules, and means for causing a different gas to flow slowly past said orifice, said different gas having a mean free path longer than the mean free path of the first gas.

5. The pump of claim 4 wherein the different gas flow emerges from an orifice close to said first mentioned orifice.

6. A gas pump, comprising a gaseous fluid duct having therein an opening through which the fluid passes in gaseous form, means for producing throughout a narrow width at the side of said opening and predominantly toward the outlet end thereof a molecular movement of vapor molecules, and means for supplying said vapor molecules to the side of said opening independent of said gaseous fluid, the width of said opening being of the order of the mean free path of the gas particles on the outlet side of said opening.

7. A gas pump, comprising a gaseous fluid duct including an opening through which the fluid passes in gaseous form, means for producing throughout a narrow width adjacent said opening, and predominantly toward the outlet end thereof a molecular movement of vapor molecules, and means for supplying said vapor molecules to the side of said opening independent of said gaseous fluid, the width of said opening being of the order of the mean free path of the vapor molecules adjacent said opening.

8. A gas pump, comprising a gaseous fluid duct including an opening through which the fluid passes in gaseous form, means for producing throughout a narrow width adjacent said opening and predominantly toward the outlet end thereof, a molecular movement of vapor molecules having a mean effective path greater than that of the fluid molecules, the width of said opening being of the order of the mean free path of the vapor molecules adjacent said opening.

Signed by me at Boston, Mass., this 19th day of September, 1924.

CHARLES G. SMITH.

CERTIFICATE OF CORRECTION.

Patent No. 1,815,121.                                                       Granted July 21, 1931, to

CHARLES G. SMITH.

It is hereby certified that error appears in the printed specification of the above numbered patent requiring correction as follows: Page 4, line 8, claim 2, for the article "the" first occurrence read that; and that the said Letters Patent should be read with this correction therein that the same may conform to the record of the case in the Patent Office.

Signed and sealed this 22nd day of September, A. D. 1931.

(Seal)                                                              M. J. Moore,
                                                                 Acting Commissioner of Patents.